(12) United States Patent
Kumazawa

(10) Patent No.: US 7,470,214 B2
(45) Date of Patent: Dec. 30, 2008

(54) CLUTCH CONTROL APPARATUS

(75) Inventor: Atsushi Kumazawa, Tokyo (JP)

(73) Assignee: Mitsubishi Fuso Truck and Bus Corporation (JP)

( * ) Notice: Subject to any disclaimer, the term of this patent is extended or adjusted under 35 U.S.C. 154(b) by 227 days.

(21) Appl. No.: 11/394,265

(22) Filed: Mar. 30, 2006

(65) Prior Publication Data

US 2006/0223672 A1 Oct. 5, 2006

(30) Foreign Application Priority Data

Mar. 30, 2005 (JP) ............................ 2005-097541

(51) Int. Cl.
*F16D 25/12* (2006.01)
(52) U.S. Cl. .................. 477/166; 477/907; 192/84.6
(58) Field of Classification Search ................ 192/84.6, 192/90; 477/906
See application file for complete search history.

(56) References Cited

U.S. PATENT DOCUMENTS 6,629,589 B2   10/2003   Inoue
7,190,138 B2 *  3/2007   Kamio et al. ................ 318/445

FOREIGN PATENT DOCUMENTS

| DE | 3501477 A1 | 7/1986 |
| JP | 2002-349698 A | 12/2002 |
| JP | 2003-530530 A | 10/2003 |
| WO | WO 01/76905 A1 | 10/2001 |

OTHER PUBLICATIONS

Office Action issued in corresponding patent application No. 200610067470.5, dated Nov. 2, 2007.

* cited by examiner

*Primary Examiner*—Sherry L Estremsky
*Assistant Examiner*—Edwin A Young
(74) *Attorney, Agent, or Firm*—Rossi, Kimms & McDowell, LLP

(57) ABSTRACT

Electric-motor drive control means controls a clutch engaging/disengaging actuator including two electric motors. When a vehicle starts moving or changes gears, the electric-motor drive control means drives both of the two electric motors in drive modes that require high responsiveness from an automatic clutch device and drives the two electric motors alternately in other drive modes that do not require high responsiveness. Malfunctions of the electric motors are detected during the operation. When one of the electric motors malfunctions, a warning is issued and the actuator is driven with the other electric motor that is normal. When both of the electric motors malfunction, a warning prompting a driver to stop the vehicle is issued.

6 Claims, 6 Drawing Sheets

CLUTCH CONTROL APPARATUS

BACKGROUND OF THE INVENTION

1. Field of the Invention

The present invention relates to clutch control apparatuses for vehicles, and more particularly, to a clutch control apparatus that includes an actuator for engaging and disengaging a clutch with two electric motors, that uses one or both of the electric motors as necessary, and that detects malfunctions of the electric motors and warns a driver.

2. Description of the Related Art

Recently, mechanical automatic transmissions that can perform automatic transmission using actuators attached to transmission gear mechanisms and clutch mechanisms similar to those of manual transmission vehicles have been developed and put to practical use mainly in large vehicles, such as trucks and busses.

In such a Vehicle, a friction clutch (hereafter simply called a clutch) disposed between an engine and a transmission and a gear shift mechanism of the transmission are activated by actuators that are respectively attached to the friction clutch and the gear shift mechanism.

The actuators may be electric actuators using electric motors, fluid-pressure actuators, such as pneumatic actuators using air cylinders and hydraulic actuators using hydraulic cylinders, etc. In particular, for the purpose of saving power and space, clutch engaging/disengaging actuators and gear-shift actuators using electric motors are suggested.

When an actuator is operated with a single electric motor, clutch control cannot be performed if the electric motor malfunctions and it becomes impossible to drive. In addition, the actuator cannot be operated with desirable responsiveness when only one electric motor is used.

In order to solve these problems, actuators using two or more electric motors as a power source are suggested.

When, for example, two electric motors are used as a power source and the two electric motors are always driven simultaneously, the actuator can be operated even if a malfunction, such as a self-rotation failure, occurs in one of electric motors. Therefore, the operation is continued without detecting the malfunction and it suddenly becomes impossible to drive when the other electric motor malfunctions. When only one of the electric motors is always driven to compensate for malfunctions, if the electric motor that is being driven malfunctions, the actuator is operated by driving the other electric motor. In this case, the clutch operation cannot be performed with desirable responsiveness when the vehicle starts moving or changes gears.

SUMMARY OF THE INVENTION

In light of the above-described situation, an object of the present invention is to provide clutch control means that drives electric motors in accordance with the responsiveness required in a clutch operation and that can detect malfunctions of the electric motors.

In order to achieve the above-described object, a clutch control apparatus according to the present invention includes an engine, a transmission, a clutch interposed between the engine and the transmission; a clutch actuator having at least two electric motors for driving the clutch; a clutch control element that operates the two electric motors simultaneously or one of the electric motors to control an operation of the clutch actuator; and a warning element that issues a warning if the warning element determines that the one of the electric motors is malfunctioning when the one of the electric motors is operated.

The clutch control element operates the two electric motors simultaneously or one of the electric motors. When only one of the electric motors is operated, it is determined whether or not the electric motor is operated normally. If the electric motor is not operated normally, a warning is issued.

In the clutch control apparatus according to the present invention, one or both of two electric motors is/are used as necessary and a warning is issued to indicate that inspection and repair are necessary if a malfunction of the electric motors is detected.

DETAILED DESCRIPTION OF THE INVENTION

An embodiment of the present invention will be described in detail below with reference to the accompanying drawings.

Figure 1:
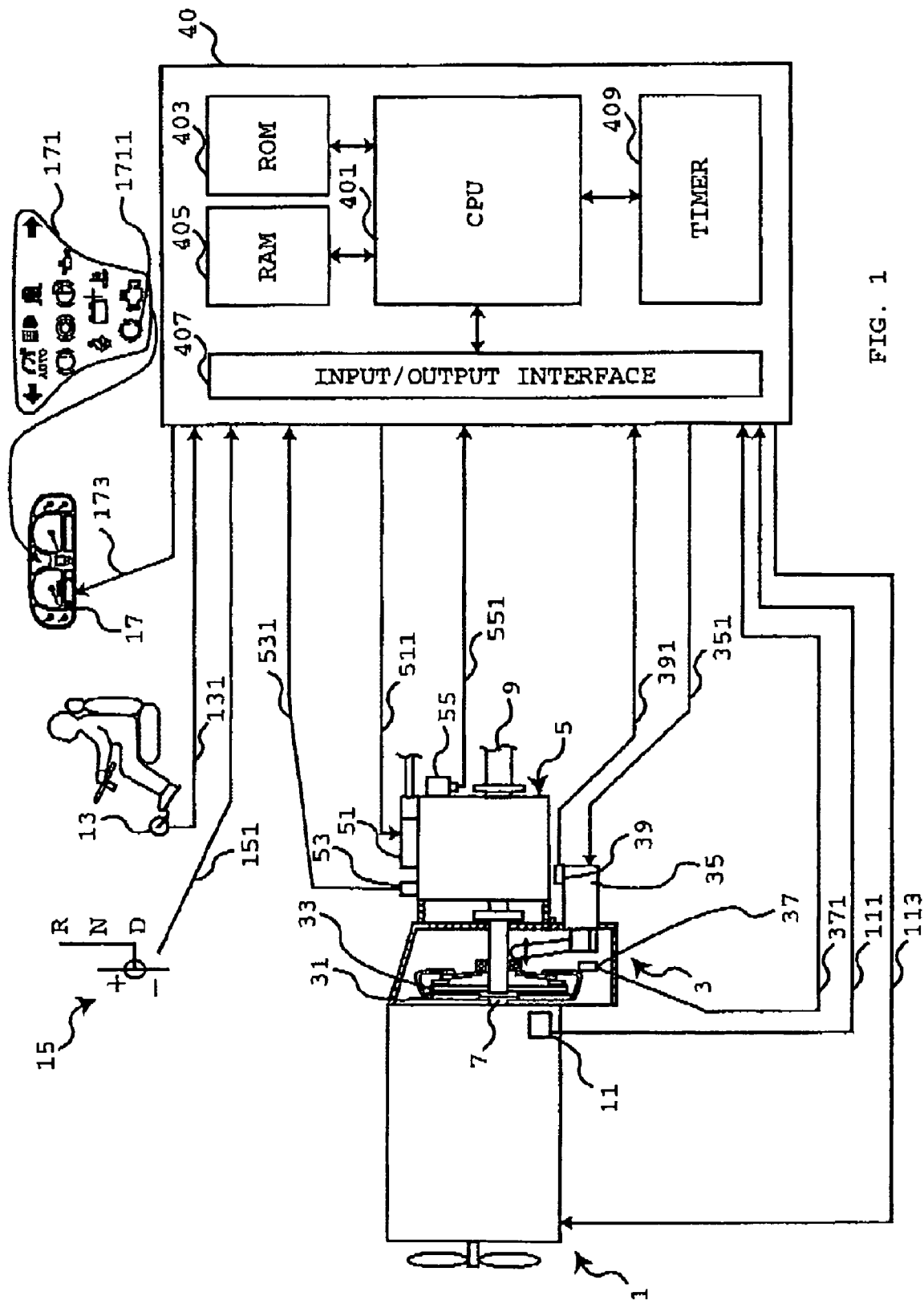
FIG. 1 is a diagram illustrating the structure of a mechanical automatic transmission according to an embodiment of the present invention.

As shown in FIG. 1, an engine output shaft 7 that projects from an engine 1 is connected to a mechanical automatic transmission 5 with an automatic clutch device 3 interposed therebetween. The output of the engine 1 is transmitted to the mechanical automatic transmission 5 that has a function of changing gears. The mechanical automatic transmission 5 is an automatic transmission mechanism having a reverse (R) gear and a plurality of (for example, six) forward gears, and manual transmission can also be performed.

When the mechanical automatic transmission 5 changes gears, the automatic clutch device 3 is engaged or disengaged automatically.

The engine 1 has an engine rotation sensor 11 that detects an engine speed, that is, a rotational speed of the engine output shaft 7.

The automatic clutch device 3 automatically performs the operation of a common mechanical friction clutch. More specifically, the automatic clutch device 3 changes the state thereof between an engaged state in which a clutch disc (also called a friction clutch or simply a clutch) 33 is pressed against a flywheel 31 and a disengaged state in which the clutch disc 33 is separated from the flywheel 31.

A clutch engaging/disengaging actuator 35 is connected to the clutch disc 33. The actuator 35 is activated when a voltage is applied to electric motors included in the actuator 35, and accordingly the clutch disc 33 is moved to automatically engage or disengage the clutch.

A clutch stroke sensor 39 that detects a clutch stroke, that is, the amount of movement of the clutch disc 33 is attached to the automatic clutch device 3. In addition, a clutch rotation sensor 37 that detects a rotational speed of the clutch disc 33 is disposed near the clutch disc 33.

The mechanical automatic transmission mechanism 5 is driven by a gear-shift actuator 51 to perform a transmission operation. The gear-shift actuator 51 is used for driving gear-shift components disposed in the mechanical transmission 5 in a select direction and a shift direction and includes, for example, two pairs of electric motors. In the transmission operation, the gear-shift actuator 51 drives the gear-shift components and changes the meshing state of the mechanical automatic transmission 5 to shift to a desired gear.

The engine 1 is controlled by an engine control signal 113 output from an electronic control unit (ECU) 40. The clutch engaging/disengaging actuator 35 and the gear-shift actuator 51 are also driven by respective control signals from the ECU 40.

The ECU 40 includes a central processing unit (CPU) 401 that performs processes based on control programs; a read only memory (ROM) 403 that stores control programs for the engine 1, the automatic clutch device 3, and the mechanical automatic transmission 5 including a program for providing clutch-release-margin ensuring means which will be described below together with data required for the control operations; a random access memory (RAM) 405 that stores the result of calculations and the like; an input/output interface 407; and a timer 409.

The ECU 40 receives a change lever operation signal 151, which is an operation signal of a change lever unit 15; a throttle valve opening signal 131 obtained by an accelerator pedal position sensor attached to an accelerator pedal 13; a clutch stroke signal 391 obtained by the clutch stroke sensor 39 attached to the clutch engaging/disengaging actuator 35; a gear position signal 531 output from a gear position switch 53 attached to the gear-shift actuator 51; a clutch rotational speed signal 371 obtained by the clutch rotation sensor 37 attached to the automatic clutch device 3; a vehicle velocity signal 551 obtained by a vehicle velocity sensor 55 provided at an output side of the mechanical automatic transmission mechanism 5; and an engine speed signal 111 obtained by the engine rotation sensor 11 provided on the engine 1 via the input/output interface 407.

The ECU 40 processes the above-mentioned input signals and outputs the engine control signal 113, a clutch actuator drive signal 351, and a gear-shift actuator drive signal 511 for driving the engine 1, the clutch engaging/disengaging actuator 35, and the gear-shift actuator 51, respectively, via the input/output interface 407.

The clutch engaging/disengaging actuator 35 and the gear-shift actuator 51 respectively receive adequate voltages on the basis of the clutch actuator drive signal 351 and the gear-shift actuator drive signal 511 output from the ECU 40, and are driven accordingly. Thus, the automatic clutch device 3 performs the clutch engaging/disengaging operation and the mechanical automatic transmission 5 performs the gear-shift operation.

A front panel of the driver's cabin of the vehicle has an indicator unit 17 that displays a speed meter, a tachometer, and a warning display panel 171 that displays the driving state, warnings, etc. The warning display panel 171 has a warning lamp 1711 for indicating malfunctions of devices including the engine 1, the automatic clutch device 3, and the mechanical transmission 5.

The ECU 40 outputs an indicator display signal 173 to the indicator unit 17 via the input/output interface 407 and turns on the warning lamp 1711 if there are any malfunctions in the devices.

The driver can switch between the automatic shift mode and the manual shift mode using the change lever unit 15 while driving. More specifically, a lever of the change lever unit 15 is set to drive "D" by the driver, the ECU 40 controls the clutch engaging/disengaging actuator 35, the gear-shift actuator 51, and the engine 1 such that the optimum gear is selected on the basis of the signals representing the driving state (the vehicle speed signal 551, the engine speed signal 111, the engine load, etc.) output from various sensors (automatic shift mode).

The driver can also manually issue a shift command for changing gears. More specifically, when the driver sets the lever of the change lever unit 15 to "+" or "−", the change lever operation signal 151 for shifting up or down the gear by one step is input to the ECU 40. Then, the ECU 40 controls the clutch engaging/disengaging actuator 35, the gear-shift actuator 51, and the engine 1 on the basis of this signal (manual shift mode).

In other words, in the automatic shift mode, the ECU 40 determines whether or not it is necessary to change gears on the basis of information regarding the driving state including the vehicle velocity and the engine load. In the manual shift mode, the ECU 40 outputs a shift signal based on the shift command issued by the driver and controls the operation of disengaging the clutch, changing gears, and engaging the clutch while controlling the output of the engine 1.

Figure 2:
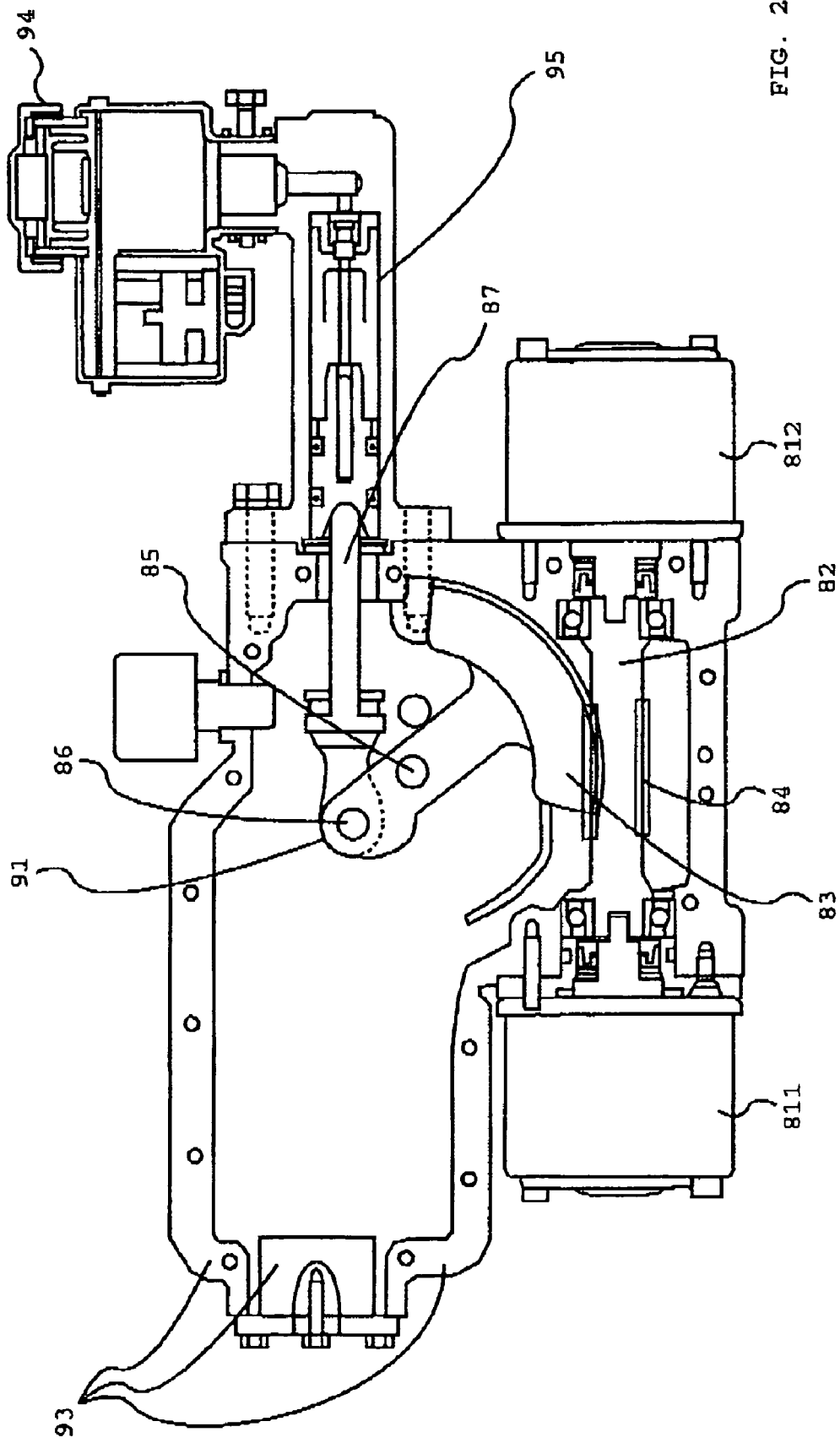
FIG. 2 is a diagram illustrating a clutch engaging/disengaging actuator.

FIG. 2 is a diagram illustrating the clutch engaging/disengaging actuator 35.

The clutch engaging/disengaging actuator 35 includes two electric motors 811 and 812. The two electric motors 811 and 812 have a common output shaft 82, and a worm 84 is formed on the output shaft 82. The worm 84 meshes with a worm gear 83 that swings around a shaft 85. The worm gear 83 is a shaft 86 that is different from the shaft 85, and the shaft 86 engages with a piston 87. The piston 87 expands and contracts in the left-right direction in FIG. 2 as the worm gear 83 swings.

The piston 87 moves left and right in a clutch-stroke driving fluid-pressure cylinder 95. The clutch-stroke driving fluid-pressure cylinder 95 is connected to a hydraulic pile (not shown) at the right end thereof, and the hydraulic pressure generated by the expansion and contraction of the piston 87 is transmitted to the clutch section via the hydraulic pipe. Accordingly, the clutch disc 33 is activated and the clutch engaging/disengaging operation is performed. In addition, the clutch-stroke driving fluid-pressure cylinder 95 is also connected to a reservoir tank 94 at the right end thereof, and fluid is supplied from the tank 4 when the amount of fluid in the clutch-stroke driving fluid-pressure cylinder 95 becomes insufficient.

Figure 3:
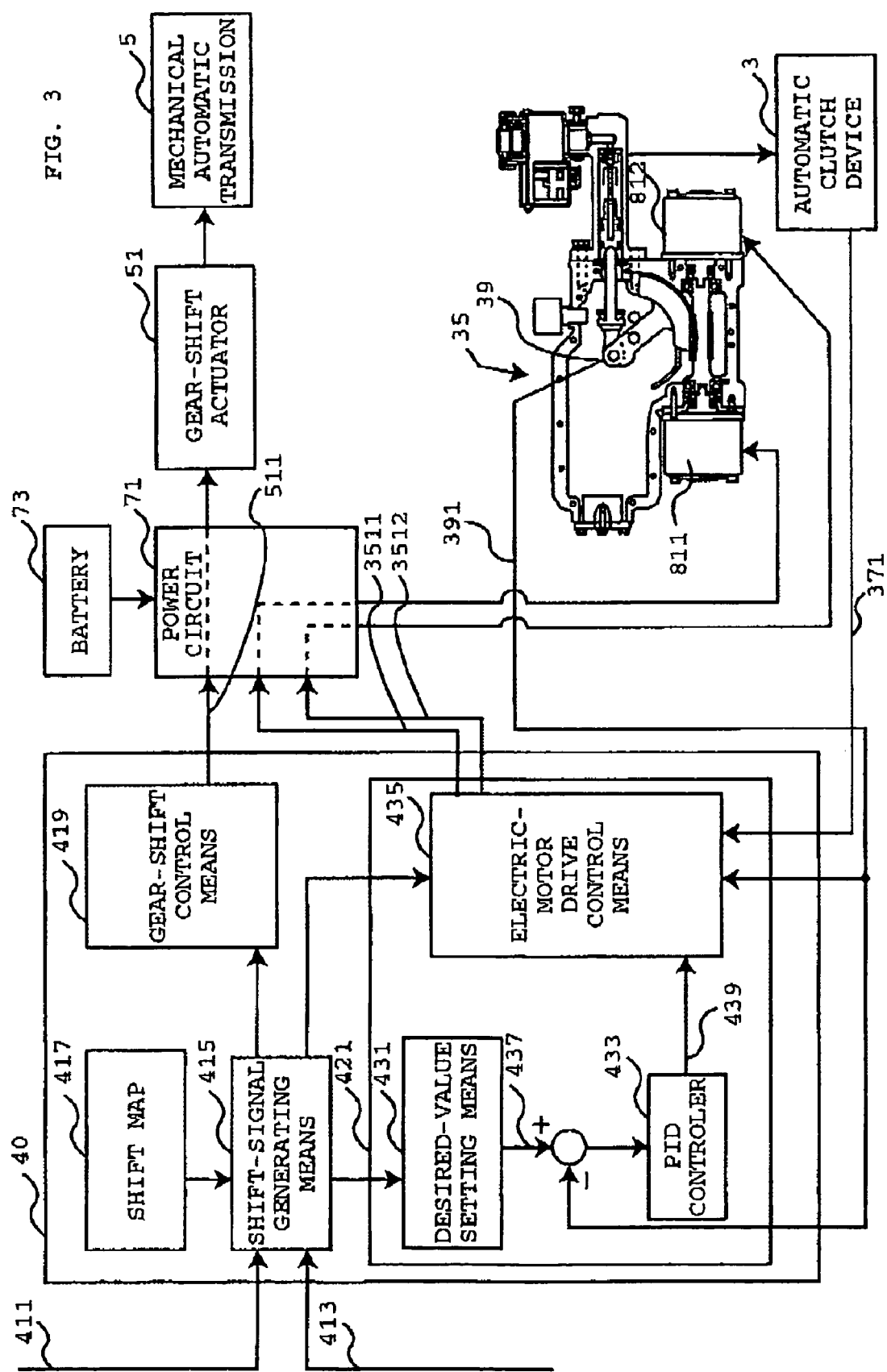
FIG. 3 is a functional block diagram of the mechanical automatic transmission.

FIG. 3 is a functional block diagram of the mechanical automatic transmission. A method for controlling the two electric motors 811 and 812 will be described below with reference to FIG. 3.

As shown in FIG. 3, the ECU 40 includes shift-signal generating means 415, gear-shift control means 419, and clutch control means 421, and these means are stored in a memory unit, such as the ROM 403, included in the ECU 40 as programs. The ECU 40 controls the automatic transmission operation and drives the vehicle by causing the CPU 401 to execute these programs. Although the ECU 40 also stores programs for providing means for controlling the engine 1, explanations thereof are omitted here.

When the vehicle is driving, the shift-signal generating means 415 sets a gear and issues a gear change request if it is necessary to change gears. Accordingly, the clutch control means 421 generates a signal for engaging/disengaging the clutch and controls the clutch engaging/disengaging actuator 35 to operate the automatic clutch device 3. In addition, when the gear change request is issued by the shift-signal generating means 415, the gear-shift control means 419 controls the gear-shift actuator 51 such that the selected gear is set in the mechanical automatic transmission 5.

FIG. 3 will be described in more detail below.

When the driver selects the manual or automatic transmission by operating the change lever unit 15 while driving the vehicle, a manual/automatic transmission command 411 is input to the shift-signal generating means 415. In the manual shift mode, an upshift request or a downshift request is generated when the driver operates the change lever unit 15 and accordingly the gear is determined.

When the automatic shift mode is selected by the manual/automatic transmission command 411, the shift-signal generating means 415 receives signals including the vehicle velocity signal 551, the throttle valve opening signal 131, etc., normally input from the ECU 40 via the input/output interface 407 as driving-state information 413 and determines the gear on the basis of the obtained information.

Figure 7:
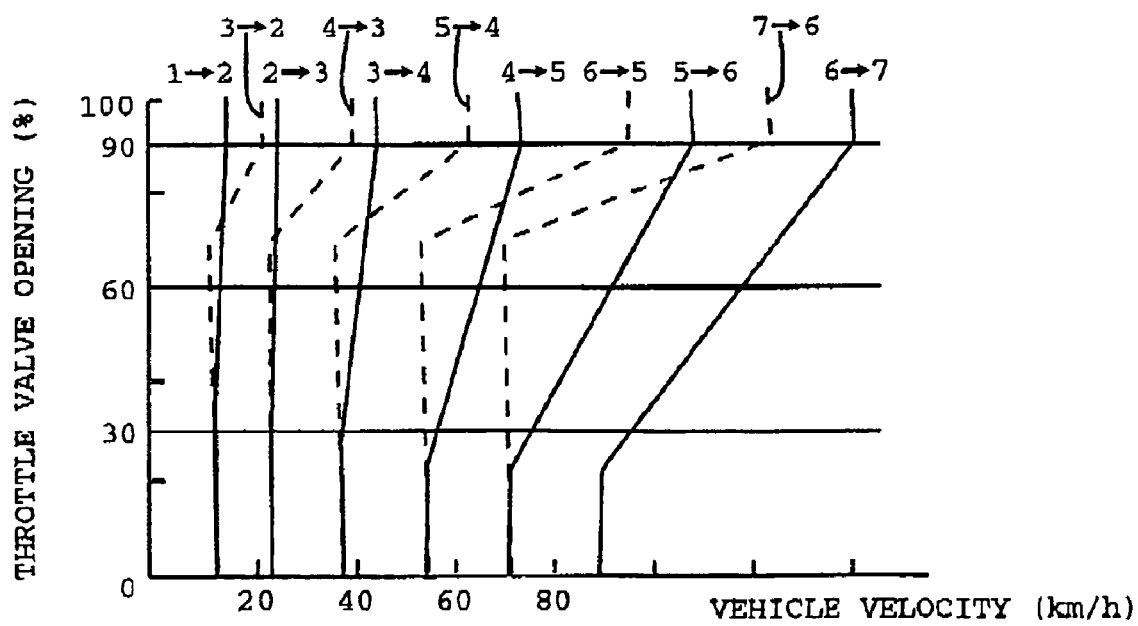
FIG. 7 is a diagram illustrating a shift map.

More specifically, the ROM 403 in the ECU 40 stores a shift map 417 as shown in FIG. 7, and the gear suitable for the current driving state is selected on the basis of the vehicle velocity and the throttle valve opening using the shift map 417.

When a gear is selected, the shift-signal generating means 415 transmits signals to the clutch control means 421 and the gear-shift control means 419 and changes gears by controlling the automatic clutch device 3 and the mechanical automatic transmission 5.

Next, the operation of controlling the automatic clutch device 3 will be described below.

The clutch control means 421 receives a signal representing vehicle start or gear change from the shift-signal generating means 415. When the vehicle starts, the state of the automatic clutch device 3 is changed from the disengaged state to a half-clutch state, and then to the engaged state. When the gears are changed, the state of the automatic clutch device 3 is changed from the engaged state to the disengaged state, and the gears are changed in the disengaged state. After the gear change, the disengaged state is changed to the half-clutch state and then to the engaged state.

In this case, desired-value setting means 431 included in the clutch control means 421 sets a desired clutch stroke that represents a position to which the clutch disc 33 is to be moved on the basis of the information obtained from the shift-signal generating means 415 (information of vehicle start or kind of gear change). The desired clutch stroke is set to, for example, a value in the range of 0 V to 5 V. The clutch is engaged when this value is substantially 0 V, and becomes disengaged when this value reaches, for example, about 3.0 V. Since these values differ for each vehicle and vary with time, suitable values are determined in advance and are stored in the RAM 405 in the ECU 40 or the like.

The desired clutch stroke set by the desired-value setting means 431 is output as a control target 437 and is compared with the current clutch stroke that is measured by the clutch stroke sensor 39 attached to the clutch engaging/disengaging actuator 35.

More specifically, when the gears are changed, the clutch is disengaged. Accordingly the control target 437 representing the desired clutch stroke is set to, for example, 3 V. Since the clutch is still in the engaged state at this time and the current stroke signal 391 is, for example, 0 V, the difference between the desired value and the current value is +3 V, and this value is fed to a PID controller 433 as an input. After the gear change, the control target 437 changes temporally since the state of the clutch is gradually changed from the disengaged state to the half-clutch state, and then to the engaged state. When, for example, the desired value is set to 2.9 V, the difference from the clutch stroke signal 391 (3 V) is −0.1 V, and this value is input to the P1D controller 433. The P1D controller 433 is a known method that causes the actual clutch stroke value to converge to the control target 437.

A PID control value 439 output from the PID controller 433 is input to electric-motor drive control means 435 that controls the two electric motors included in the clutch engaging/disengaging actuator 35. In addition, the shift-signal generating means 415 inputs the engine speed signal 111, the shifting method (start or gear change), etc., included in the driving-state information 413 to the electric-motor drive control means 435. In addition, the clutch stroke signal 391 obtained by the clutch stroke sensor 39 in the clutch engaging/disengaging actuator 35 and the clutch rotational speed signal 371 obtained by the clutch rotation sensor 37 attached to the automatic clutch device 3 are also input to the electric-motor drive control means 435.

The electric-motor drive control means 435 outputs an electric motor 1 drive signal 3511 and an electric motor 2 drive signal 3512 for controlling the two electric motors 811 and 812, respectively. These drive signals 3511 and 3512 indicate voltages to be applied to the electric motors 811 and 812, respectively, by a power circuit 71, and the power circuit 71 drives the two electric motors 811 and 812 by applying the indicated voltages to the electric motors 811 and 812 using a power source (battery) 73.

As described above, in the clutch control apparatus according to the present embodiment, the two electric motors are driven simultaneously when high responsiveness is required in the clutch operation and only one of the two electric motors is driven when the required responsiveness is low.

Figure 5:
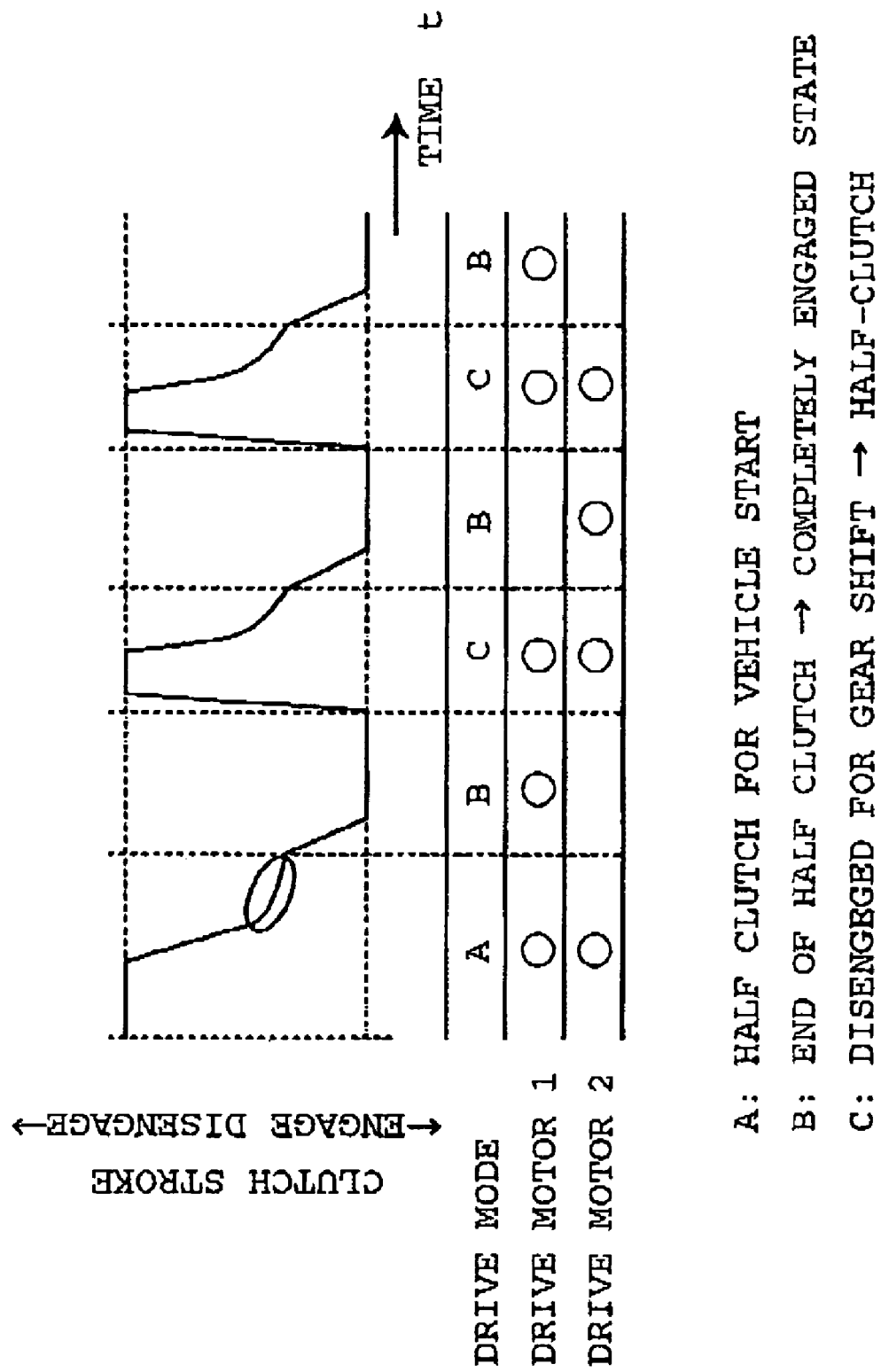
FIG. 5 is a diagram illustrating drive modes using two electric motors.

FIG. 5 is a diagram illustrating the drive modes using the two electric motors.

Referring to FIG. 5, a drive mode A corresponds to a clutch operation period in which the vehicle starts moving and high responsiveness is required. In this period, the clutch stroke is gradually reduced from the state in which the clutch is disengaged until half-clutch control is finished. The point at which the half-clutch control is finished (denoted by 'b' in the figure) corresponds to the time at which, for example, the clutch rotational speed and the engine speed become equal to each other. In FIG. 5, the half-clutch control is performed in the region denoted by 'a', where high control accuracy is required even though the clutch stroke is changed gradually.

In the drive mode A, both of the two motors (811 and 812) are driven since high responsiveness is required.

A drive mode B corresponds to a period including a period from the point 'b' at which the half-clutch control is finished to the point at which the clutch is engaged and a period in which the clutch stays engaged. In this mode, only one of the electric motors is driven.

A drive mode C corresponds to a period from the point at which the clutch is disengaged for gear change to the point at which the half-clutch control is finished after the gear change. In this period, both of the two motors are driven since high responsiveness is required.

The electric-motor drive control means 435 distinguishes the above-described drive modes from each other and drives the electric motors 811 and 812 accordingly. In the drive mode B in which only one of the electric motors is used, the electric motor 811 and the electric motor 812 are used alternately.

Figure 4:
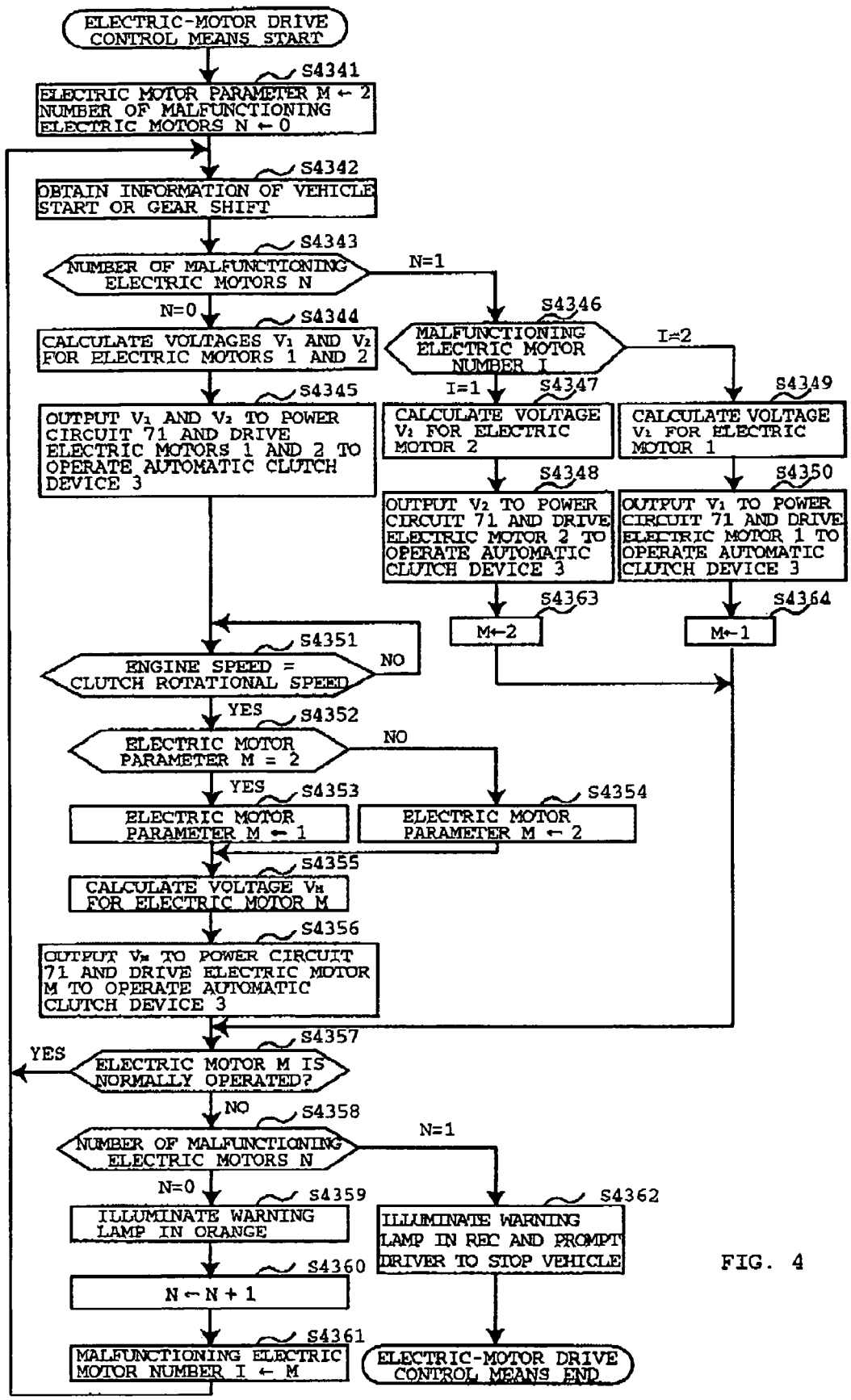
FIG. 4 is a flowchart illustrating a process performed by electric-motor drive control means.

Next, the process performed by the electric-motor drive control means 435 will be described below with reference to FIG. 4.

First, an electric motor parameter M is defined as a parameter for designating the electric motor to be used when only one of the electric motors is used, and this parameter is set to 2 for convenience. In addition, the number N of malfunctioning electric motors is set to 0 (S4341).

Then, information indicating the vehicle start or gear change is obtained from the shift-signal generating means 415 (S4342). As shown in FIG. 5, the drive mode A is selected when the vehicle starts and the drive mode C is selected when the gears are changed. When neither of the electric motors 811 and 812 is malfunctioning, the two electric motors 811 and 812 are driven simultaneously.

More specifically, first, it is determined whether or not there is a malfunctioning electric motor (S4343). When neither of the electric motors 811 and 812 is malfunctioning (N=0 in S4343), the voltage $V_1$ to be applied to the electric motor 1 (811) and the voltage $V_2$ to be applied to the electric motor 2 (812) are calculated (S4344). The calculated voltages $V_1$ and $V_2$ are transmitted to the power circuit 71, and the electric motor 1 (811) and the electric motor 2 (812) are simultaneously driven to operate the automatic clutch device 3 (S4345).

As shown in FIG. 2, the electric motor 1 (811) and the electric motor 2 (812) use the common output shaft 82 and are disposed at the ends of the output shaft 82. Therefore, the electric motor 1 (811) and the electric motor 2 (812) are rotated in the opposite directions to rotate the output shaft 82 in a certain direction.

Since the output shaft 82 is rotated by both of the electric motors 811 and 812, the worm bear 83 is operated with quick response and thus the responsiveness can be increased.

When the gear change is started, the electric-motor drive control means 435 controls the voltages applied to the electric motors 811 and 812 so as to disengage the automatic clutch device 3, and then the gears are changed. Then, the electric-motor drive control means 435 controls the voltages applied to the electric motors 811 and 812 such that the state of the automatic clutch device 3 is gradually changed to the engaged state (S4344 and S4345).

When the vehicle starts moving, the electric-motor drive control means 435 controls the voltages applied to the electric motors 811 and 812 such that the state of the automatic clutch device 3 is changed from the disengaged state to the engaged state (S4344 and 4345).

After S4345, the clutch rotational speed 371 and the engine speed 111 are compared with each other (S4351). When the clutch rotational speed 371 and the engine speed 111 are equal to each other (yes in S4351), it is determined that the half-clutch control of the automatic clutch device 3 is finished and the drive mode is changed to the drive mode B. Until the clutch rotational speed 371 reaches the engine speed 111 (no in S4351), S4351 is repeated.

In the drive mode B, only one of the electric motors is driven.

Accordingly, the electric motor parameter M is checked. If the electric motor 2 (812) is used the previous time (yes in S4352), the electric motor parameter M is changed to 1 (S4353). If the electric motor 1 (811) is used the previous time (no in S4352), the electric motor parameter M is changed to 2 (S4354). Then, the voltage $V_M$ to be applied to the electric motor M is calculated and the calculated voltage $V_M$ is transmitted to the power circuit 71. Then, the electric motor M is driven to operate the automatic clutch device 3 (S4356).

More specifically, the electric-motor drive control means 435 controls the voltage applied to one of the electric motor 1 and the electric motor 2 such that the state of the automatic clutch device 3 is changed from the half-clutch state to the engaged state.

In the drive mode B, that is, in the state in which only one of the electric motors is driven, it is determined whether or not the electric motor M is operated normally (S4357). For example, it is determined whether or not a voltage higher than a threshold of 7.2 V is applied for a time longer than a predetermined period, for example, one second. If a voltage equal to or higher than 7.2 V is applied for one second or more, it is determined that the electric motor M is operating abnormally (no in S4357). The abnormality can be determined by the above-described method since the operation of the actuator necessary for the clutch operation would be completed when an adequate voltage is applied for an adequate time if the electric motor is operating normally. Accordingly, if an excessively high voltage is applied for a long time, it can be decided that the electric motor is not operating normally.

When the electric motor M is operating normally (yes in S4357), the process returns to S4342 and waits for the next command of gear change or vehicle start from the shift-signal generating means 415.

If the electric motor M is operating abnormally (no in S4357), the number N of malfunctioning electric motors is checked (S4358). When N is 0, it means that only one of the two electric motors is malfunctioning. Accordingly, the warning lamp 1711 on the warning display panel 171 of the indicator unit 173 is illuminated in, for example, orange (S4359), and the number N of malfunctioning electric motors is incremented by one (S4360). Then, the identification number M of the electric motor that is malfunctioning is assigned to the malfunctioning electric motor number I (S4361), and then the process returns to S4342.

When only one of the two electric motors is malfunctioning, the automatic clutch device 3 can still be operated by the other electric motor that is normal, although high responsiveness cannot be obtained.

Figure 6:
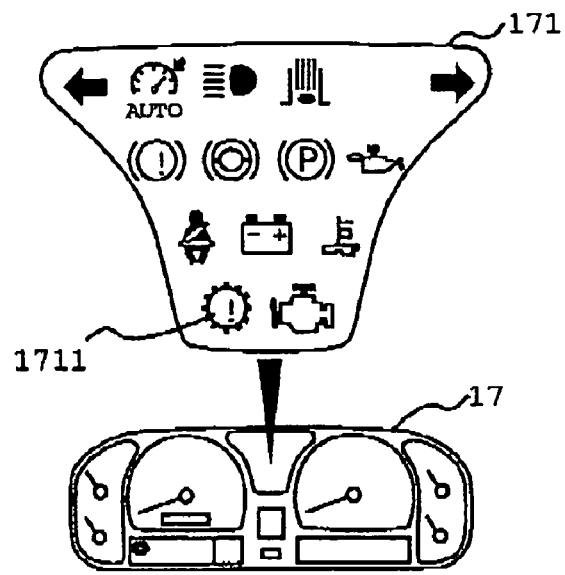
FIG. 6 is a diagram illustrating a warning display panel.

As shown in FIG. 6, the warning lamp 1711 is arranged together with warning lamps for a seat belt, oil, water temperature, battery, etc. on the warning display panel 171 included in the indicator unit 17. The warning lamp 1711 illuminates, for example, in orange or red as necessary to warn the driver. For example, the warning lamp 1711 illuminates in red to prompt the driver to stop the vehicle immediately and contact a repair shop, and illuminates in orange to inform the driver that a malfunction has occurred and inspection and repair are necessary even though the vehicle can still drive.

If the number N of malfunctioning electric motors is 1 in S4358, it means that both of the two electric motors are malfunctioning. Accordingly, the warning lamp 1711 is illuminated in red and the process is finished.

When the process returns to S4342 from S4357 or S4361 and the next command of gear change or vehicle start is issued from the shift-signal generating means 415, the number N of malfunctioning electric motors is checked (S4343). When N is 0, S4344, S4345, and S4351 to S4361 are repeated as described above.

When N is 1, the malfunctioning electronic motor number I is checked (S4346). The identification number M of the malfunctioning electric motor is assigned to the malfunctioning electronic motor number I in S4361. Therefore, when I is 1, the voltage $V_2$ to be applied to the electric motor 2 is calculated (S4347) and transmitted to the power circuit 71, and the electric motor 2 is driven so as to operate the automatic clutch device 3 (S4348). Then, the electric motor parameter M is set to 2 (S4363). When I is 2, the voltage $V_1$ to be applied to the electric motor 1 is calculated (S4349) and transmitted to the power circuit 71, and the electric motor 1 is driven so as to operate the automatic clutch device 3 (S4350). Then, the electric motor parameter M is set to 1 (S4364).

When one of the electric motors is malfunctioning, the automatic clutch device 3 is operated using only the other electric motor that is normal. Therefore, all of the clutch operations including the operations other than that after the half-clutch control are performed using only one electric motor that is normal.

Then, it is determined whether or not the electric motor M is operating normally in S4357. If the electric motor M is operating normally (yes), the process returns to S4342 and the following steps are repeated. If electric motor M is not operating normally (no), it means that both of the two electric motors are malfunctioning. Therefore, the warning lamp 1711 illuminates in red (S4362) and the driver is prompted to stop the vehicle. Then, the process is finished.

Accordingly, one or both of the electric motors is/are used in accordance with the required responsiveness. In addition, malfunctions of the electric motors are detected. When one of the electric motors is malfunctioning, a warning can be issued while controlling the automatic clutch device 3 using the other electric motor. When both of the electric motors are malfunctioning, a warning prompting the driver to stop the vehicle can be issued.

The present invention is not limited to the above-described embodiments, and various modifications are possible within the technical scope of the present invention. In addition, although the voltage threshold and the time period used for detecting malfunctions of the electric motors are set to 7.2 V and one second, respectively, the present invention is not limited to this.

What is claimed is:

1. A clutch control apparatus comprising:
   a clutch interposed between an engine and a transmission;
   a clutch actuator having at least first and second electric motors for driving the clutch;
   a clutch control element that selectively operates either one of the first or second electric motor or both the first and second motors depending on a selected one of drive modes to control an operation of the clutch actuator; and
   a warning element that issues a warning if the warning element determines that the one of the first or second electric motor is malfunctioning when only the one of the first or second electric motor is operated.

2. The clutch control apparatus according to claim 1 wherein:
   the clutch control element includes a determining element that determines whether or not a clutch operation requires high responsiveness, and
   the clutch control element operates both the first and second electric motors simultaneously when the determining element determines that the clutch operation requires high responsiveness and operates the one of the first or second electric motor when the determining element determines that the clutch operation does not require high responsiveness.

3. The clutch control apparatus according to claim 2, wherein the determining element determines that the clutch operation requires high responsiveness when a clutch stroke is in a period in which a clutch state is changed from a disengaged state to a half-clutch state to start driving, a period in which the clutch state is changed from an engaged state to the disengaged state in response to a gear shift request, or a period in which the clutch state is changed from the disengaged state to the half-clutch state after gear shift.

4. The clutch control apparatus according to claim 2, wherein, when the warning element determines that the one of the first or second electric motor is malfunctioning, the clutch control element operates only the other of the first or second electric motor even if the determining element determines that the clutch operation requires high responsiveness.

5. The clutch control apparatus according to claim 1, wherein, when the warning element determines that the one of the first or second electric motor is malfunctioning, the clutch control element operates the other of the first or second electric motor.

6. The clutch control apparatus according to claim 1, wherein the warning element determines that the one of the first or second electric motor is malfunctioning if a voltage equal to or higher than a predetermined drive voltage threshold is applied to the one of the first or second electric motor for a time longer than a predetermined time.

* * * * *